United States Patent
Dujeu et al.

(10) Patent No.: US 9,362,051 B2
(45) Date of Patent: Jun. 7, 2016

(54) SELF-PROTECTED LOW-VOLTAGE CAPACITOR

(71) Applicant: SCHNEIDER ELECTRIC INDUSTRIES SAS, Rueil-Malmaison (FR)

(72) Inventors: Olivier Dujeu, Domene (FR); Christophe Guillermin, Sillingy (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 249 days.

(21) Appl. No.: 14/107,408

(22) Filed: Dec. 16, 2013

(65) Prior Publication Data

US 2014/0177125 A1 Jun. 26, 2014

(30) Foreign Application Priority Data

Dec. 21, 2012 (FR) ...................................... 12 62666

(51) Int. Cl.
*H01G 2/14* (2006.01)
*H01G 2/18* (2006.01)
*H01G 4/015* (2006.01)

(52) U.S. Cl.
CPC . *H01G 2/14* (2013.01); *H01G 2/18* (2013.01); *H01G 4/015* (2013.01)

(58) Field of Classification Search
CPC ............ H01G 2/14; H01G 2/18; H01G 4/015
USPC .............. 361/272, 273, 275.2, 517, 518, 535, 361/536
See application file for complete search history.

(56) References Cited

U.S. PATENT DOCUMENTS

| 4,150,419 | A | 4/1979 | Epple et al. |
| 8,274,778 | B2 * | 9/2012 | Yoshinaga ............... H01G 4/32 361/301.5 |

FOREIGN PATENT DOCUMENTS

| DE | 27 31 796 A1 | 2/1979 | |
| DE | EP 0023543 A2 * | 2/1981 | ............... H01G 2/14 |
| EP | 0 530 115 A1 | 3/1993 | |
| GB | 1 578 212 | 11/1980 | |

OTHER PUBLICATIONS

Wikipedia_Aluminium hydroxide, Nov. 26, 2011 at 23:30.*
French Preliminary Search Report issued Aug. 5, 2013, in French Application No. 12 62666 filed Dec. 21, 2012 (with Written Opinion and English Translation of Categories).
French Preliminary Search Report issued Aug. 5, 2013, in French Application No. 12 62666 filed Dec. 21, 2012 (with Written Opinion and English Translation of Categories of Cited Documents).

* cited by examiner

*Primary Examiner* — Nguyen T Ha
(74) *Attorney, Agent, or Firm* — Oblon, McClelland, Maier & Neustadt, L.L.P

(57) ABSTRACT

The capacitor (2) according to the invention comprises:
- an enclosure (4);
- an insulating material (6) contained in the enclosure (4);
- a capacitive device (8) comprising two conductive layers and at least one dielectric layer formed from a dielectric material and inserted between the two conductive layers; and
- a protection device (12) comprising a mechanism (40) for disconnecting the capacitive device (8) in case of overpressure in the enclosure (4);

and characterized in that it further comprises, inside the enclosure (4), a degassing material (58) capable of releasing gas at a degassing temperature (Tgaz) below the decomposition temperature of the dielectric material to generate an overpressure in the enclosure (4).

10 Claims, 3 Drawing Sheets

SELF-PROTECTED LOW-VOLTAGE CAPACITOR

The present invention relates to a capacitor comprising:
an enclosure;
an insulating material contained in the enclosure;
a capacitive device comprising two conductive layers and at least one dielectric layer formed from a dielectric material and inserted between the two conductive layers; and
a protection device comprising a mechanism for disconnecting the capacitive device in case of overpressure in the enclosure.

More specifically, the invention relates to the field of low-voltage power capacitors of the self-healing type.

"Capacitor of the self-healing type" refers to a capacitor including at least one capacitive device housed in an enclosure and formed by a winding of two complexes each comprising a conductive layer and a dielectric layer. Each conductive layer forms an electrode. Each complex is obtained by metallization of one face of a dielectric film.

When a minor fault appears in such a capacitor, a localized breakdown occurs and leads to the evaporation of an electrode near the fault, without damage to the adjacent film. The localized breakdown causes evaporation of the electrode at the breakdown point and, as a result, insulation of that faulty area. The winding preserves its insulation, and the capacity loss due to the periodic evaporation of the electrode is negligible.

During abnormal biases, in particular in case of overvoltages or temperature increases, a dielectric breakdown may deteriorate the self-healing quality of the capacitor. The resulting increase of the current that passes through the winding causes a temperature increase in the vicinity of the fault and a production of gas due to the decomposition of the dielectric film. The enclosure in which the winding is positioned may then explode under the effect of the pressure produced by the gas.

To offset this problem, self-healing capacitors traditionally comprise a protective device comprising a mechanism for disconnecting from the winding in case of overpressure in the enclosure.

As an example, patent FR 2,598,024 describes a capacitor comprising such a protective device. The protective device comprises a deformable membrane belonging to the wall of the enclosure and capable of deforming upon an overpressure due to an internal fault of the winding in the enclosure. It further includes a contact whereof closure is caused by the deformation of the membrane to short-circuit the winding and thus avoid any physical deterioration of the enclosure.

However, certain internal faults may appear without generating gases or generating gas in a small quantity or at a very low speed. This is in particular the case for impeding faults that evolve slowly. The protective device does not see these internal faults due to the absence or low generation speed of gases, and consequently may not be activated. Furthermore, certain very localized faults may break the enclosure before the gases generated by the internal fault become visible by the protective system.

The invention aims to provide a low-voltage capacitor of the self-healing type comprising a protective device operating even in cases of the appearance of faults generating little or no gas.

To that end, the invention relates to a capacitor of the aforementioned type, further comprising, inside the enclosure, a degassing material capable of releasing gas at a degassing temperature below the decomposition temperature of the dielectric material to generate an overpressure in the enclosure.

The capacitor according to the invention may comprise one or more of the following features, considered alone or according to any technically possible combination:
the degassing material is incorporated into the insulating material;
the degassing material forms a degassing layer positioned between the insulating material and the protective device;
the insulating material sealably coats the capacitive device;
the degassing material is formed by aluminum hydroxide;
the dielectric material is formed by polypropylene;
the degassing temperature is below 350° C.;
the degassing temperature is comprised between 150 and 300° C.;
the capacitive device comprises two conductive layers and two dielectric layers superimposed alternating, the capacitive device being wound to form a winding;
the device comprises at least two electrical conductors connected to the capacitive device, in that the protective device includes a deformable membrane capable of deforming under the effect of an overpressure in the enclosure, so as to cause a disconnection between at least one of the electrical conductors and the capacitive device; and
the enclosure includes a side wall, and in that a passage interval for the gas is formed between the side wall of the enclosure and the capacitive device so as to facilitate the conveyance of the gas toward the membrane.

The invention will be better understood upon reading the following description, provided solely as an example and done in reference to the appended drawings, in which.

Figure 1:
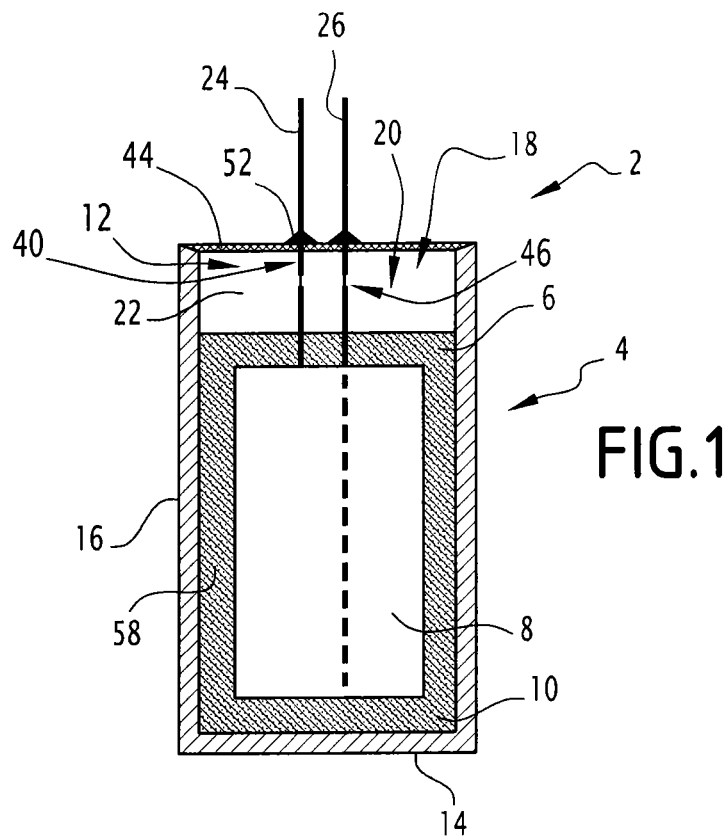
FIG. 1 is a diagrammatic illustration of a capacitor according to a first embodiment of the invention in which the protective device is not activated.
Figure 2:
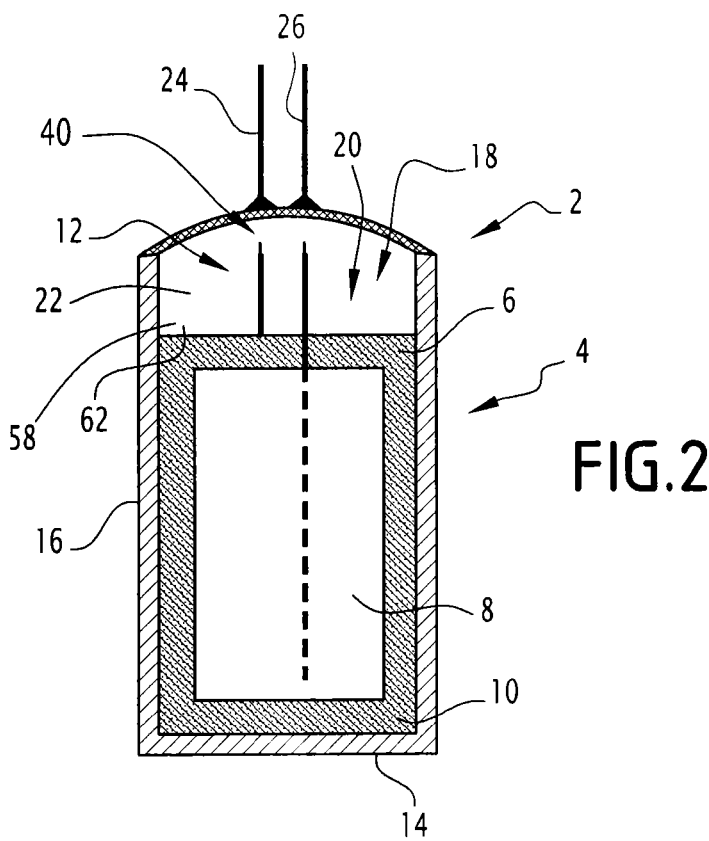
FIG. 2 is a diagrammatic illustration of a capacitor according to the first embodiment of the invention in which the protective device is activated.

In reference to FIGS. 1 and 2, the capacitor 2 comprises an enclosure 4, an insulating material 6 and a capacitive device 8. The enclosure 4 delimits an inner volume 10, and the insulating material 6 and the capacitive device 8 are contained in the inner volume 10 of the enclosure 4.

The capacitor 2 further comprises a protective device 12.

The enclosure 4 includes a bottom wall 14, a side wall 16 and a cover 18. The side wall 16 is tubular and closed at its ends by the bottom wall 14 and the cover 18.

The cover 18 comprises an inner space 20 and is intended on the one hand to sealably close the enclosure 4 and on the other hand to house the protective device 12. The cover 18 is positioned across from the bottom wall 14.

Thus, the inner volume 10 of the enclosure 4 is laterally delimited by the side wall 16 and at its ends by the bottom wall 14 and by the cover 18.

The enclosure 4 for example has a substantially cylindrical shape.

Preferably, it is formed by a metal material. Alternatively, the enclosure 4 is formed by a plastic material. It receives the insulating material 6 and the capacitive device 8 in the inner volume 10 sealably, in particular so as to be gastight.

The insulating material 6 is contained in the inner volume 10 of the enclosure 4, and sealably coats the capacitive device 8. It is preferably formed by a resin, such as polyurethane. Alternatively, the insulating material 6 is formed by oil. The insulating material 6 partially fills the inner volume 10.

The inner volume 10 of the enclosure 4 comprises a cavity 22 situated between the cover 18 and the space occupied by the insulating material 6 and the capacitive device 8.

Figure 3:
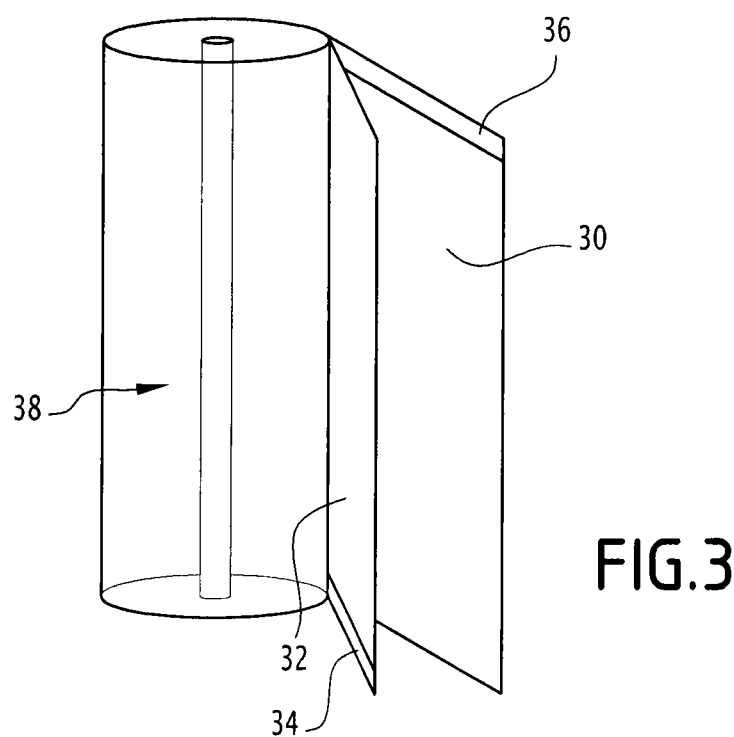
FIG. 3 is a diagrammatic illustration of a winding of a capacitor according to the invention.

As shown in FIG. 3, the capacitive device 8 comprises two conductive layers 30, 32 each defining an electrode and separated by at least one dielectric layer 34 formed by a dielectric material. The dielectric layer 34 is thus inserted between the two conductive layers 30, 32.

Preferably, the capacitive device 8 is formed by two conductive layers 30, 32 and two dielectric layers 34, 36 superimposed alternating. The capacitive device is for example formed by two dielectric layers 34, 36, each provided with a metal coating 30, 32 and superimposed and wound to form a winding 38.

Each metal coating 30, 32 respectively forms an electrode.

Each metal coating 30, 32 has a thickness comprised between 5 and 100 nm, preferably comprised between 15 and 40 nm, and is advantageously formed by aluminum, zinc, or an aluminum-zinc alloy.

Preferably, each dielectric layer 34, 36 is formed by polypropylene or polyester.

Each dielectric layer 34, 36 has a thickness comprised between 3 and 15 μm.

The winding 38 is advantageously self-healing. The capacitor 2 according to the invention therefore forms a self-healing capacitor 2.

The protective device 12 is positioned in the inner space 20 of the cover 18 of the enclosure 4.

In reference to FIGS. 1 and 2, the protective device 12 comprises a mechanism 40 for disconnecting the capacitive device 8 in case of overpressure in the enclosure 4.

The capacitor comprises at least two electrical conductors connected to the capacitive device 8. The capacitor 2 for example and as illustrated in FIGS. 1 and 2 comprises two electrical conductors 24, 26. Alternatively, the capacitor 2 is a three-phase capacitor and comprises three electrical conductors connected to three capacitive windings made up of two dielectric layers each provided with a metal coating.

Each electrical conductor comprises a breaking area 46.

Figure 4:
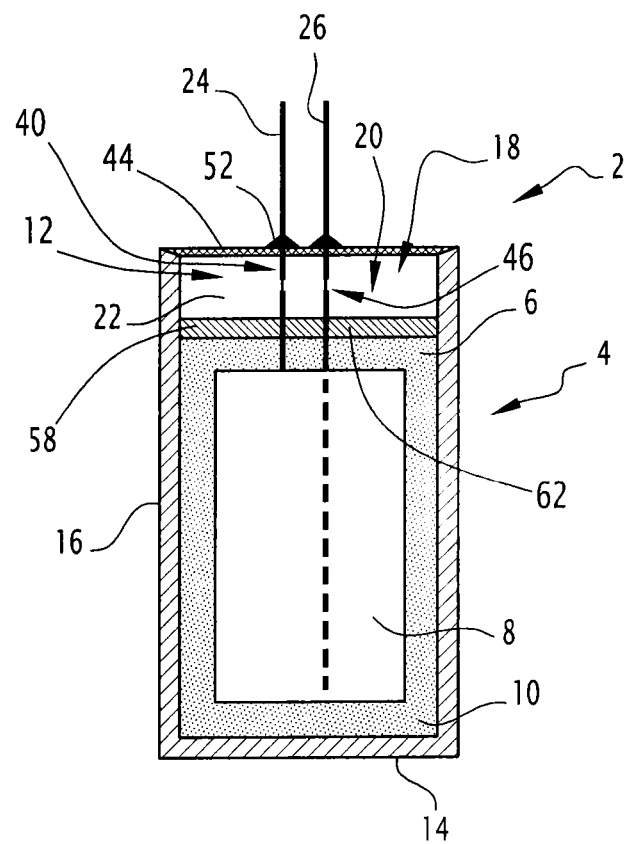
FIG. 4 is a diagrammatic illustration of a capacitor according to a second embodiment of the invention in which the protective device is not activated.

In the embodiments shown in FIGS. 1, 2 and 4, the breaking area 46 is a frangible area formed by a center portion of the electrical conductor 24, 26.

Alternatively, each electrical conductor is formed by two parts connected to each other at the breaking area 46, by means of a weld spot or by brazing.

The protective device 12 includes a membrane 44. The membrane 44 extends in a direction substantially perpendicular to the direction of extension of the electrical conductors 24, 26. The electrical conductors 24, 26 advantageously pass through the membrane 44 and are each connected to the membrane 44, for example by a weld spot 52.

The membrane 44 is deformable and capable of deforming under the effect of an overpressure in the enclosure 4, so as to cause a disconnection between at least one of the electrical conductors 24, 26 and the capacitive device 8. The disconnection between at least one of the electrical conductors 24, 26 and the capacitive device 8 is done at the breaking area 46.

In reference to FIGS. 1 and 2, the capacitor 2 comprises, in the inner volume 10 of the enclosure 4, a solid or liquid degassing material 58 capable of releasing the gas at a degassing temperature Tgaz below the decomposition temperature of the dielectric material.

The presence of the degassing material 58 is intended to allow a rapid pressure increase in the enclosure when the temperature of the enclosure 4 reaches the degassing temperature Tgaz.

The degassing temperature refers to the minimum temperature from which compounds of the degassing material evaporate. More specifically, the degassing temperature Tgaz is the temperature at which the compound of the degassing material having the lowest evaporation temperature begins to evaporate.

The decomposition temperature is the minimum temperature from which compounds of the dielectric material making up the dielectric layers evaporate. More specifically, the decomposition temperature is the temperature at which the compound of the dielectric material having the lowest evaporation temperature begins to evaporate.

In the example where the dielectric material is formed by polypropylene, the decomposition temperature is greater than or equal to 350° C.

The degassing material 58 is for example formed by aluminum hydroxide.

Advantageously, the degassing material 58 is incorporated into the insulating material 6 in the inner volume 10 of the enclosure 4, as shown in FIGS. 1 and 2. The incorporation of the degassing material 58 into the insulating material 6 has the advantage of being easy to do.

Alternatively and as shown in FIG. 4, the degassing material 58 forms a degassing layer 62 positioned between the insulating material 6 and the protective device 12. The degassing layer 62 is for example alongside the insulating material 6. This embodiment allows effective activation of the disconnecting mechanism 40.

Also advantageously, the degassing temperature Tgaz is below 350° C. Preferably the degassing temperature Tgaz is comprised between 150° C. and 300° C., preferably comprised between 200 and 300° C., and in particular equal to 220° C.

The degassing material 58 advantageously has a degassing temperature Tgaz greater than 120° C., so as not to activate the disconnecting mechanism 40 of the protective device 12 during the normal operation of the capacitor 2.

Advantageously, the capacitor 2 further comprises a passage interval for the gas formed between the side wall 16 of the enclosure 4 and the capacitive device 8 so as to facilitate the conveyance of the gas toward the protective device 12.

During normal operation of the capacitor 2, i.e., when the capacitive device 8 does not have a fault or when the self-healing function of the capacitive device 8 acts, the disconnecting mechanism 40 of the protective device 12 is not activated, as shown in FIGS. 1 and 4. During normal operation, the capacitors 24, 26 are connected to the capacitive device 8.

When a slow internal fault appears in the capacitive device 8 and the self-healing function of the capacitive device 8 no longer acts, for example in the case where the capacitor 2 is at the end of its life, the temperature increases in the enclosure 4 until it reaches the degassing temperature Tgaz. The dielectric material, for example the polypropylene, is then in the solid or liquid state, as the temperature in the enclosure 4 is, at that time, equal to the degassing temperature Tgaz, which in turn is below the decomposition temperature of the dielectric material. From that moment, the degassing material 58, for example aluminum hydroxide, begins to evaporate and therefore to generate gas. An overpressure then appears in the enclosure 4, and the membrane 44 deforms due to that overpressure.

By deforming, it exerts a pulling force on the electrical conductors 24, 26 and causes the electrical conductors 24, 26 to break at the breaking area 46, as shown in FIG. 2.

The degassing temperature Tgaz being lower than the decomposition temperature of the dielectric material, the disconnecting mechanism 40 is activated even when the internal fault situated in the winding 38 does not generate enough gas to allow the deformation of the membrane 44 and the disconnection of the capacitive device 8.

The presence of aluminum hydroxide in the enclosure 4 makes it possible to ensure a rapid pressure increase sufficient to activate the disconnecting mechanism more safely and reliably, and therefore to preserve the physical integrity of the enclosure of the capacitor 2, in particular when the self-healing function of the capacitor 2 no longer acts in a satisfactory manner.

Alternatively, the capacitor comprises other types of protective device. The protective device for example comprises a short-circuiting mechanism and a fuse connected in series to the capacitive device, as for example described in FR 2,959,588.

The invention claimed is:

1. A capacitor comprising:
    an enclosure;
    an insulating material contained in the enclosure;
    a capacitive device comprising two conductive layers and at least one dielectric layer formed from a dielectric material and inserted between the two conductive layers; and
    a protection device disconnecting the capacitive device in case of overpressure in the enclosure,
    wherein the capacitor further comprises, inside the enclosure, a degassing material releasing gas at a degassing temperature below the decomposition temperature of the dielectric material to generate an overpressure in the enclosure,
    wherein the degassing material is formed by aluminum hydroxide.

2. The capacitor according to claim 1, wherein the degassing material is incorporated into the insulating material.

3. The capacitor according to claim 1, wherein the degassing material forms a degassing layer positioned between the insulating material and the protective device.

4. The capacitor according to claim 1, wherein the insulating material sealably coats the capacitive device.

5. The capacitor according to claim 1, wherein the dielectric material is formed by polypropylene.

6. The capacitor according to claim 1, wherein the degassing temperature is below 350° C.

7. The capacitor according to claim 6, wherein the degassing temperature is comprised between 150 and 300° C.

8. The capacitor according to claim 1, wherein the capacitive device comprises two conductive layers and two dielectric layers superimposed and alternating, the capacitive device being wound to form a winding.

9. The capacitor according to claim 1, wherein the capacitor further comprises at least two electrical conductors connected to the capacitive device,
    wherein the protective device includes a deformable membrane that is deformable under the effect of an overpressure in the enclosure, causing a disconnection between at least one of the electrical conductors and the capacitive device.

10. The capacitor according to claim 9, wherein the enclosure includes a side wall and a passage interval for the gas that is formed between the side wall of the enclosure and the capacitive device, facilitating the conveyance of the gas toward the deformable membrane.

* * * * *